United States Patent [19]

Becker et al.

[11] Patent Number: 4,830,881
[45] Date of Patent: May 16, 1989

[54] METHOD OF MAKING A CONTAINER

[75] Inventors: Aaron J. Becker, Plum Boro; G. Edward Graddy, Jr.; Stephen C. Libby, both of Murrysville; Gerald E. Carkin, Tarentum; Jan H. L. van Linden, Allison Park, all of Pa.

[73] Assignee: Aluminum Company of America, Pittsburgh, Pa.

[21] Appl. No.: 64,549

[22] Filed: Jun. 22, 1987

[51] Int. Cl.$^4$ .............................................. B05D 7/22
[52] U.S. Cl. .................................... 427/230; 427/399
[58] Field of Search ...................... 427/230, 314, 399

[56] References Cited

U.S. PATENT DOCUMENTS

| | | | |
|---|---|---|---|
| 4,382,997 | 5/1983 | Henslee et al. | 427/399 |
| 4,429,003 | 1/1984 | Fredriksson et al. | 428/317.9 |
| 4,581,295 | 4/1986 | DeLiso et al. | 428/446 |

FOREIGN PATENT DOCUMENTS 165754 12/1985 European Pat. Off. .
59-217957 12/1984 Japan .
767069 9/1980 U.S.S.R. .

Primary Examiner—Bernard Pianalto
Attorney, Agent, or Firm—Gary P. Topolosky

[57] ABSTRACT

A container for a material, said container having a liner comprised of an equilibrated reaction product of the material. Preferably, the material is a molten aluminum-lithium alloy and the reaction product consists essentially of lithium aluminate. A method of making the container comprises shaping a substance into a vessel, said substance having sufficient porosity to react with the material and form a non-wetting reaction product without spalling; and introducing the material to the vessel. A method of making a container liner by applying a substance to the container inner surface and introducing the alloy to the inner surface is also disclosed.

35 Claims, No Drawings

METHOD OF MAKING A CONTAINER

BACKGROUND OF THE INVENTION

1. Field of the Invention

This invention relates to a material container and method of making same. The invention further relates to a liner for a molten metal container. Particularly, the invention relates to containers and liners for holding molten aluminum-lithium alloys.

2. Description of the Prior Art

When making, treating, transporting or otherwise handling certain materials, including corrosive molten metals, it often becomes necessary to hold such materials in a vessel capable of withstanding extreme temperatures and harsh chemical conditions for extended periods of time. Containers made from such substances as silica, calcium silicate and aluminum silicate are used for handling many aluminum alloy melts. Such components have porosities which cause them to at least partially absorb the molten metal in contact with the container, however. To inhibit such absorption, it is known to provide porous refractories with a protective silicon carbide-based coating as in U.S. Pat. No. 4,429,003 and block the flow of oxidizing gases into the refractory's internal phases. Should a portion of coating layer flake or spall off, more deeply deposited carbide particles will oxidize and renew the protective sealing layer.

It is further known to manufacture molten metal container tiles from a mixture of zirconium oxide, neodymium oxide, aluminum oxide and between 8-14% by weight lithium oxide. Tiles made from such mixtures as disclosed in Russian Pat. No. 767,069 are supposedly more heat resistant.

When lithium is added to molten aluminum, other metal handling complications arise. Because lithium increases the oxidation rate of most metals to which it is alloyed, aluminum-lithium generally contaminates or corrodes many refractory substances in contact therewith. A graphite container, for example, self-destructs when exposed to an aluminum-lithium melt. As lithium depletes from the molten alloy and penetrates pores and cracks in the container, the original container interior begins to swell and spall away in a matter of hours, thereby exposing more of the container structure to corrosive metal attack.

Commercially preferred sizes of molten metal containers are usually made from a plurality of blocks or bricks joined with mortar. Such assemblies are not available for aluminum-lithium containment, however, unless both the blocks and mortar withstand prolonged molten metal attack. In U.S. Pat. No. 4,581,295, there is disclosed a refractory assembly for containment of molten aluminum-lithium. The bricks of this assembly consist of silicon carbide with a bonding agent (silicon nitride or silicon oxynitride) dispersed throughout. The mortar mix comprises a particulate nitride filler, colloidal sol binder and less than 2% by weight of a magnesium, calcium, chromium or manganese oxide or hydroxide. In a preferred embodiment, up to 20% boron nitride is added to the mortar to make it non-wetting with respect to the contained molten alloy. Such containment materials are not perfect, however, as evidenced by the amount of silicon the alloy absorbs at FIG. 4.

It is further known to treat refractories with a fluoride-bearing material which is not wetted by molten aluminum. In European patent Application No. 165,754, there is disclosed a method for applying magnesium fluoride ($MgF_2$) to articles made from alumina, silica, calcium silicate, and especially aluminum silicate, for enhancing their resistance to molten aluminum-magnesium attack. The above reference also states that the same or similar compounds may be used with lithium-containing aluminum alloys. However, at Example 1, page 27, treated and non-treated tubes are only exposed to an Al-0.5% Mg alloy containing 30 ppm Li (and 50 ppm Na). Such trace amounts do not typically qualify as an aluminum-lithium alloy. In addition, thermodynamic calculations indicate that such coatings would not be stable when exposed to greater quantities of lithium. Although capable of withstanding attack by aluminum-magnesium melts, $MgF_2$ coatings should slowly dissolve in the presence of a true aluminum-lithium melt.

It is still further known to manufacture sintered sheet electrolyte holders for fused salt fuel cells from a slurry of lithium aluminate powder, methanol solvent, dibutyl phthalate plasticizer and polyvinyl alcohol binder. Exemplary of such manufacturing methods is that disclosed in Japanese Pat. No. 59/217,957.

SUMMARY OF THE INVENTION

It is a principal object of the present invention to provide a container for a material having an impervious liner which is not subject to long-term chemical attack or spalling.

It is a further object of this invention to provide a container having a liner formed by the natural interaction of its contents with a substance either applied to the container inner surface or incorporated therein.

It is still a further object of the invention to provide a container having a liner formed by reducing the reaction potentials between the container contents and the substance applied to the container inner surface or incorporated therein.

It is still a further object of the invention to provide molten aluminum-lithium alloy containers with a non-wetting liner, thereby reducing the tendency of alloy penetration beyond the container inner surface. Such liners should not overly contaminate the contained metal melt with substantial quantities of silicon, either.

It is still a further object of the invention to provide a container which overcomes the disadvantages and problems of the prior art mentioned above.

In accordance with the foregoing objects of this invention, and other advantages which will become apparent from the detailed description of the preferred embodiments which follows, there is provided a container for a material, said container having a liner comprised of an equilibrated reaction product of the material. Preferably, the material is a molten aluminum-lithium alloy and the reaction product consists essentially of lithium aluminate. A method of making the container comprises shaping a substance into a vessel, said substance having sufficient porosity to react with the material and form reaction product without spalling; and introducing the material to the vessel. The container may also be made by combining this substance with other components to form a mixture for shaping into a vessel.

A method of making a liner for the above container comprises applying the same substance to an inner surface of the container by coating or impregnation, heating the container at a sufficient temperature to dehydrate the substance, and introducing the material to the inner surface. Preferred substances include gamma lithium aluminate, a kaolinitic clay, or an alumina, magnesium oxide or magnesium aluminate spinel capable of accommodating a particular percentage of volume expansion upon reaction with the material.

DETAILED DESCRIPTION OF THE PREFERRED EMBODIMENTS

The present invention is directed to a container for a material such as corrosive molten metal. The container includes an inner barrier or liner comprised of an equilibrated reaction product of the material. The reaction product is preferably thermodynamically equilibrated and consists of elements having chemical potentials equal to the chemical potentials of the same elements in the material. Preferably, the material contained by this invention is a molten aluminum-lithium alloy and the reaction product consists essentially of lithium aluminate. As used herein, the term "aluminum-lithium alloy" refers to a composition containing predominantly aluminum, about 0.1-15% by weight lithium, preferably about 2-5% lithium and minor amounts of magnesium, copper, zirconium and other incidental additives or impurities. It is to be understood that the invention may also be used to contain other materials, especially other molten metal alloys, by chemical equilibration.

The present invention also discloses a method of making a material container having a liner comprised of an equilibrated reaction product of the material. The method comprises shaping a substance into a vessel, said substance having sufficient porosity to react with the material and form reaction product without spalling; and introducing the material to the vessel. When this container is preferably used to hold molten aluminum-lithium for extended periods of time, the substance consists essentially of: (1) gamma lithium aluminate and/or other forms of lithium aluminate; (2) a magnesium oxide capable of accommodating less than about 15% volume expansion; or (3) a magnesium aluminate spinel capable of accommodating less than about 32% volume expansion. The foregoing substances may be shaped into a vessel by any known means. Most preferably, such substances are packed, rammed or vibrated in steel shells similar to the way in which crucibles are made from a ramming mix sold commercially as "Minrosil" ® by Allied Mineral Products, Inc. of Columbus, Ohio. Molten aluminum-lithium is then introduced to this vessel at a sufficient rate for allowing the alloy and substance to react and form lithium aluminate (reaction product) at the container inner surface. The rate of material introduction to the vessel may vary depending on the substance or substances used to shape same. In most instances, however, molten metal is freely dumped into a completed vessel according to this invention.

Alternatively, material containers may be manufactured according to the invention by combining a substance with other components to form a mixture; shaping the mixture into a vessel; and introducing the material to this vessel, provided that the combined substance has sufficient porosity to react with the material and form equilibrated reaction product without spalling. By this embodiment, non-wetting reaction product constituents are incorporated into containers manufactured from existing components. Particularly, molten aluminum-lithium containers may be fabricated by adding to such components as the carbide-bonded or nitride-bonded silicon carbide taught in U.S. Pat. No. 4,581,295 (the disclosure of which is incorporated herein by reference) the following substances: an alumina capable of accommodating less than about 20% volume expansion; a kaolinitic clay having a fine or average grain particle size less than about 0.002 mm; a magnesium oxide capable of accommodating less than about 15% volume expansion; or a magnesium aluminate spinel capable of accommodating less than about 32% volume expansion.

The thermodynamic principles behind this invention may also be used to make molten metal container liners of equilibrated reaction product. A method of making such liners comprises applying a substance to an inner surface of the container, said substance having sufficient porosity to react with the molten metal and form non-wetting reaction product without spalling; heating the container at a sufficient temperature to dehydrate the substance, when necessary; and introducing the metal to the container inner surface. Best results are obtained when this inner surface is coated with less than about 1.0 mm (0.039 inch), and most preferably with between about 0.1-0.2 mm (0.004-0.008 inch) of the substance. After the substance has been applied, the container may be fired or heated to a preferred dehydration temperature between about 982°-1204° C. (1800°-2200° F.). For alumina, kaolinitic clay or magnesium oxide, the substance may be coated onto the inner container surface by any known means. Such substances may be prepared as a liquid or slurry, then brushed or sprayed to the above thicknesses. If especially thin layers are desired, the applied substances may be subsequently wiped or stricken by any known means.

The substance which forms reaction product according to the invention may also be applied by impregnating a container inner surface with same. Particularly, substances such as the aforementioned alumina, kaolinitic clay and magnesium oxide may be pressure filtrated into a container interior or vacuum filtered from outside of same. Other materials, such as gamma lithium aluminate, may also be used to impregnate containers for holding molten aluminum-lithium alloys.

Preferably, the alumina used to shape a vessel or coat an inner surface according to this invention should accommodate less than about 20% volume expansion. Aluminas will accommodate greater than 50% volume expansion when reacting according to the formula

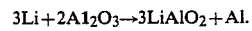

$$3Li + 2Al_2O_3 \rightarrow 3LiAlO_2 + Al.$$

The reaction product layer produced by this reaction almost always undesirably spalls off into the melt, however.

The magnesium oxide and magnesium aluminate spinel embodiments of this invention contain molten aluminum-lithium more predictably because of smaller volume expansions associated therewith. Magnesium oxide reacts according to the formula:

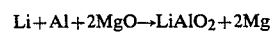

$$Li + Al + 2MgO \rightarrow LiAlO_2 + 2Mg$$

to produce approximately 15% volume expansion. Hence, any form of magnesium oxide capable of accommodating less than about 15% volume expansion would theoretically produce liners capable of not crumbling or spalling away. Similar improved results may be observed using a magnesium aluminate spinel capable of accommodating less than the theoretical 32% volume expansion associated with reacting same according to the formula:

$$2Li + MgAl_2O_4 \rightarrow 2LiAlO_2 + Mg.$$

The following examples are intended by way of illustration and not intended to limit the scope of this invention.

EXAMPLE 1

A magnesia mixture, sold commercially by Allied Mineral Products, Inc., as "Minroram TC312", was packed in a steel shell. The vessel was heated to 899° C. (1650° F.) for about 8 hours for setting purposes. An alloy containing 99.95% aluminum was then melted, poured into the vessel and allowed to set until its composition stabilized. After stabilization, the metal was alloyed to a composition which included about 3% lithium and 1% copper, by weight; then maintained at 760° C. (1400° F.). On each day of this test, the oxide film which formed on the molten surface was removed so that daily metal samples could be taken. The container contents were then realloyed to the same composition above.

The results of these daily metal analyses revealed increases in the magnesium content of the alloy to about 1.14% and in the calcium content to about 0.034% (when corrected for dilution by the metal samples removed and fresh metal added). However, while the magnesium contamination rate decreased to about zero after only six (6) days, the rate of calcium contamination never decreased significantly.

After sixteen (16) days, the test was terminated, the alloy removed and the container disassembled for analysis (or autopsy). A physical inspection revealed only one horizontal radial crack through the approximate middle of this container. A few intergranular cracks which apparently also formed, selfhealed by filling with molten alloy and subsequently reacting with the surrounding matrix. Closer examination revealed a container inner surface lined with three (3) distinct zones of reaction product: inner reaction zone 1 was discolored to solid, medium grey; intermediate zone 2 was discolored to dark grey; and outer reaction zone 3 was not noticeably discolored at all but remained friable. The depths of each reaction zone varied as follows:

|  | Zone 1 | Zone 2 | Zone 3 |
| --- | --- | --- | --- |
| Upper sidewall at the metal line | 1–1.5 mm | 2–2.5 mm | about 3 mm |
| Middle sidewall | about 4 mm | 4–6 mm | 2 mm |
| Lower sidewall | 2–2.5 mm | 3–4 mm | 2.5–3 mm |
| Base | 2–2.5 mm | 1.5–2.5 mm | 1–4 mm |

It is believed that coarse MgO grains within zone 1 underwent partial reaction, especially along their grain boundaries, to form finely-grained lithium aluminate. Finer MgO grains also reacted to form $LiAlO_2$, thereby accounting for the extreme hardness of the innermost zone to this container.

Microscopic analyses on the above container liner showed no water-reactive lithium in either zone 1 or 2. Only zone 3 contained free lithium oxide/hydroxide. The presence of lithium aluminate in zone 1 was later confirmed by X-ray diffraction analysis. Although no metal physically appeared to penetrate zone 2, X-ray diffraction revealed the presence of at least small quantities of $LiAlO_2$.

Still further analysis on a section of container sidewall revealed that calcium dissolution occurred in zone 1 only while some leaching of boron, iron, sodium and silicon occurred to slightly greater depths. Leaching of these components did not significantly contaminate the final alloy, though.

EXAMPLE 2

A magnesium aluminate spinel mixture sold commercially as "LS-964" by the Norton Company of Worcester, Mass. consisted of fused spinel grains and a bond phase of boric acid, LiF, $SiO_2$ and alpha-alumina. An unspecified quantity of this mixture was packed or vibrated in a steel shell, heated and introduced to the same alloy as in Example 1. The alloy was then maintained in the resulting container at about 760° C. (1400° F.). Daily metal analyses again revealed a fairly constant increase in the alloy calcium content after only two (2) days. A slight degree of magnesium and silicon contamination may have also occurred.

After exposure for eleven (11) days, the alloy was removed and the container autopsied. The container inner surface discolored to about 1–2 mm but in one distinct reaction product zone only. Other sections of this same container remained friable. Meanwhile, microscopic analyses on these sidewalls revealed no apparent reaction of molten alloy with a coarser (greater than 0.1 mm diameter) spinel grain. The alloy reacts extensively with a more finely grained matrix, however, to form lithium aluminate. Although lithium penetrated into this single reaction product layer quite extensively, the layer served to prevent further lithium corrosion. Beyond this inner liner layer, there was only slight penetration of lithium to depths of 13 mm and no measurable aluminum penetration.

EXAMPLE 3

A 1:2 mixture of Allied Mineral Products' magnesium oxide, sold commercially as "Minroram TC312", and spray-dried kaolinitic clay sold by Georgia Kaolin Company of Elizabeth, N.J. as KCS (No. 2 coating clay) was added to water and pressed between styrofoam cups to form a bench scale container. This container was then dried, heated to a temperature of 1204° C. (2200° F.) and filled with magnesium-free, molten aluminum-lithium. After 48 hours, the alloy was removed and analyzed to reveal the following changes in composition:

|  | Before Test | After 48 Hours |
| --- | --- | --- |
| wt % Silicon | 0.11 | 0.13 |
| wt % Iron | 0.09 | 0.11 |
| wt % Copper | 1.3 | 1.2 |
| wt % Lithium | 2.0 | 0.15 |
| wt % Magnesium | 0 | 0 |
| Aluminum | Balance | Balance |

Further disassembly and analysis of this container revealed only one dark grey discoloration zone having a thickness between about 1.0–1.5 mm. Although there was no apparent difference between the MgO grains of this discoloration zone, the matrix may have changed nevertheless based on the different polishing characteristics observed. Microscopic analyses also indicated that no alloy penetration occurred beyond the first discoloration zone due to the lack of lithium compounds found therein.

EXAMPLE 4

A second bench scale container, similar to that of Example 3, was assembled from a 1:1 mixture of Allied Mineral Products' "Minroram TC312" magnesia and Georgia Kaolin Company kaolin. After formation, additional kaolin powder having a fine grain particle size averaging less than 0.002 mm was spray coated on the container interior to a thickness of about 0.5 mm. The vessel was then fired and filled with molten aluminum-lithium. After 48 hours, the aluminum alloy included: about 1.1% lithium; 2.8% copper: 0.13% iron: 0.4% magnesium and between 0.08–0.26% silicon, by weight.

The inner kaolin coating of this container discolored to dark grey during testing, but flaked off only with subsequent handling. The container sidewalls beneath this clay liner discolored to a depth of 150 microns. X-ray diffraction analysis confirmed the presence of $LiAlSiO_4$ and gamma lithium aluminate in the resulting reaction product liner while scanning electron microscopy further confirmed that no MgO grains behind the desired kaolin liner reacted with molten metal.

EXAMPLE 5

A container made from $Si_3N_4$-bonded silicon carbide was impregnated with a kaolinitic clay slurry under a vacuum of about 27 inches of Hg until the clay penetrated completely through to the outer container walls. The container was then heated overnight to a temperature of 1204° C. (2200° F.) and exposed to a molten bath of 70% LiCl; 25% KCl; and 5% LiF for about 24 hours. The following day, an alloy consisting of 2% Li: 2% Cu: 1% Mg, the balance Al, was poured into the container (at a depth of about 15 mm) for about 18 hours. Although lithium vapor penetrated the container walls to a depth of less than about 1 mm, no aluminum-lithium alloy was lost. Slight contamination of the contained alloy may have occurred since a small amount of molten bath was not accounted for.

Having described the presently preferred embodiments, it is to be understood that the invention may be otherwise embodied within the scope of the appended claims.

What is claimed is:

1. A method of making a container for holding a molten aluminum-lithium alloy which comprises:
    combining a substance with at least one container component to form a mixture, said mixture of substance and container component having sufficient porosity to react with molten aluminum-lithium alloy and form a liner of equilibrated reaction product without substantially spalling;
    forming the mixture into a container shape; and
    introducing a sufficient amount of molten aluminum-lithium alloy to the container shape to form said reaction product liner.

2. The method of claim 1 wherein the reaction product liner consists essentially of lithium aluminate.

3. The method of claim 2 wherein the substance consists essentially of an alumina capable of accommodating less than about 20% volume expansion.

4. The method of claim 2 wherein the substance consists essentially of a kaolinitic clay having an average grain particle size lass than about 0.002 mm.

5. The method of claim 2 wherein the substance consists essentially of a magnesium oxide capable of accommodating less than about 15% volume expansion.

6. The method of claim 2 wherein the substance consists essentially of a magnesium aluminate spinel capable of accommodating less than about 32% volume expansion.

7. A method of making a container liner adapted for contacting with molten aluminum-lithium alloy, said method comprising:
    applying a substance to the inner surface of a container, said substance having sufficient porosity to react with molten aluminum-lithium alloy and form a liner of thermodynamically-equilibrated reaction product; and
    introducing molten aluminum-lithium alloy to the substance on said container inner surface at a sufficient rate to form the reaction product liner.

8. The method of claim 7 wherein the container inner surface is coated with less than about 10 mm (0.039 inch) of the substance.

9. The method of claim 7 wherein the substance is applied by impregnating the container inner surface.

10. The method of claim 9 wherein the substance consists essentially of an alumina capable of accommodating less than about 20% volume expansion.

11. The method of claim 9 wherein the substance consists essentially of a kaolinitic clay having an average grain particle size less than about 0.002 mm.

12. Th method of claim 9 wherein the substance consists essentially of a magnesium oxide capable of accomodating less than about 15% volume expansion.

13. The method of claim 8 wherein the container inner surface is coated with between about 0.1–0.2 mm (0.004–0.008 inch) of the substance.

14. The method of claim 13 wherein the substance consists essentially of an alumina capable of accommodating less than about 20% volume expansion.

15. The method of claim 13 wherein the substance consists essentially of a magnesium oxide capable of accomodating less than about 15% volume expansion.

16. The method of claim 13 wherein the substance consists essentially of a kaolinitic clay having an average grain particle size less than about 0.002 mm.

17. The method of claim 7 which further comprises: heating the container to between about 982°–1204° C. (1800°–2200° F.) before introducing molten aluminum-lithium alloy to the substance.

18. A method of making an in-situ container liner for holding molten aluminum-lithium alloy, said method comprising:
    applying a substance to the inner surface of a container for holding molten metal, said substance having sufficient porosity to react with molten aluminum-lithium alloy and form a liner of non-wetting reaction product without substantially spalling;
    heating the container to a sufficient temperature for dehydrating the substance; and
    introducing molten aluminum-lithium alloy to the substance to form said reaction product liner.

19. The method of claim 18 wherein the reaction product liner consists essentially of lithium aluminate.

20. The method of claim 18 wherein the substance consists essentially of an alumina capable of accommodating less than about 20% volume expansion.

21. The method of claim 18 wherein the substance consists essentially of a kaolinitic clay having an average grain particle size less than about 0.002 mm.

22. The method of claim 18 wherein the substance consists essentially of a magnesium oxide capable of accommodating less than about 15% volume expansion.

23. The method of claim 18 wherein the substance consists essentially of a magnesium aluminate spinel capable of accommodating less than about 32% volume expansion.

24. The method of claim 18 wherein the dehydration temperature is between about 982°–1204° C. (1800°–2200° F.).

25. A method of making a substantially spall-resistant liner for containing a molten aluminum-lithium alloy, said method comprising:

applying a substance to the inner surface of a molten metal container, said substance having sufficient porosity to react with molten aluminum-lithium alloy and form a layer of lithium aluminate at the container inner surface; and introducing molten aluminum-lithium alloy to the substance at a sufficient rate to form the lithium aluminate layer.

26. The method of claim 25 which further comprises: heating the container at a sufficient temperature to dehydrate the substance before introducing molten aluminum-lithium alloy to the same.

27. The method of claim 25 wherein the inner surface is coated with less than about 1.0 mm (0.039 inch) of the substance.

28. The method of claim 27 wherein the inner surface is coated with between about 0.1–0.2 mm (0.004–0.008 inch) of the substance.

29. The method of claim 28 wherein the substance consists essentially of an alumina capable of accommodating less than about 20% volume expansion.

30. The method of claim 28 wherein the substance consists essentially of a kaolinitic clay having an average grain particle size less than about 0.002 mm.

31. The method of claim 28 wherein the substance consists essentially of a magnesium oxide capable of accommodating less than about 15% volume expansion.

32. The method of claim 25 wherein the inner surface is impregnated with the substance.

33. The method of claim 32 wherein the substance consists essentially of an alumina capable of accommodating less than about 20% volume expansion.

34. The method of claim 32 wherein the substance consists essentially of a kaolinitic clay having an average grain particle size less than about 0.002 mm.

35. The method of claim 32 wherein the substance consists essentially of a magnesium oxide capable of accommodating less than about 15% volume expansion.

* * * * *